United States Patent Office 2,709,162
Patented May 24, 1955

2,709,162
POLYMERIZATION OF ALLYL ESTERS

Stewart B. Luce, La Grange, Ill., assignor to Swift & Company, Chicago, Ill., a corporation of Illinois No Drawing. Application November 26, 1951, Serial No. 258,279

13 Claims. (Cl. 260—78.3)

This invention relates to the catalytic polymerization of allyl esters and more particularly to the polymerization of certain allyl esters of carboxylic acids in the presence of copper or copper compounds as the sole catalytic agent therefor.

This application is a continuation-in-part of copending application, Serial No. 133,494, filed December 16, 1949, and now abandoned.

The polymerization inhibiting properties of copper and copper compounds have been generally recognized in the prior art. Such properties have been utilized to inhibit the polymerization of many compounds, including certain allyl esters. The only heretofore suggested exception to this inhibiting action of copper and its compounds has been in the polymerization of allyl esters of saturated fatty acids wherein at high temperatures and under carefully controlled conditions, a slight acceleration of the polymerization was noted.

It has now been discovered that copper and compounds thereof have a marked accelerating action on the polymerization of certain allyl esters of carboxylic acids when heated within a definite temperature range and in the open atmosphere.

One object of the present invention, therefore, is to provide a method for accelerating the polymerization of certain allyl derivatives of carboxylic acids.

A further object is to provide a method for polymerizing certain allyl esters of carboxylic acids wherein the catalyst used is relatively cheap, readily accessible, and easily recovered.

It is an additional object of this invention to provide a method for accelerating the polymerization of certain allyl esters of carboxylic acids wherein relatively low temperatures are employed and wherein the control of the reaction does not require special conditions such as superatmospheric pressures or nonoxidizing atmospheres.

Additional objects if not specifically set forth herein will be apparent to one skilled in the art from the following detailed description of the invention.

Generally the present invention comprises polymerizing allyl esters of carboxylic acids selected from the group consisting of diallyl maleate, diallyl diglycollate, triallyl citrate, diallyl citraconate, diallyl itaconate, allyl sorbate, and mixtures thereof in the presence of a copper-containing compound as the sole accelerating catalyst. Among the compounds suitable for employment as catalysts may be listed metallic copper, cupric chloride, cupric ammonium chloride, cupric acetate, cupric sulfate, and copper-chromium oxide catalyst (see Organic Syntheses, vol. 19, p. 31, for the preparation of this compound).

More specifically the present invention contemplates the polymerization of the compounds listed above by heating such compounds in the presence of a small amount of one of the listed catalysts, said polymerization being carried out in the liquid phase, preferably under atmospheric pressures and preferably at a temperature between about 125° C. and an upper temperature between about 200° C. and 210° C. If desired, the reaction may be carried out with the specified allyl derivatives in solution. Solvents for this purpose should have a boiling point above about 130° C. and may include various hydrocarbons, ethers, esters, alcohols, and halogenated compounds, such as xylene, amyl acetate, capryl alcohol, dichlorethyl, ether, isoamyl ether, chlorobenzene, butyl cellosolve, and nitropropane.

The temperature range for the polymerization is fixed specifically by the necessity of practical considerations. For example, theoretically the lower limit could be any temperature, but the time involved in completing polymerization requires a practical limit be imposed. It has been found possible to obtain polymerization with temperatures as low at 100° C., but for practical purposes a temperature of about 125° C. will be about the lowest recommended. At such a temperature it has been found necessary to use a relatively large percentage, comparatively speaking, of catalyst in order to induce polymerization (about 1.0 per cent). The upper limit, using the preferred method of the invention, is theoretically the boiling point of the material being polymerized. Of course, by utilizing superatmospheric pressures this temperature could be increased above such temperature limitation. However, practical limitations again preferably require a more specific limitation. As will be apparent from the following examples, the upper temperature preferably should be kept to a point at which the reaction is controllable in order to avoid charring of the resulting polymer. Example VII (following) illustrates a case in which use of too high a temperature resulted in some charring of the product. In this case a temperature of 200°–210° C. was used. From the foregoing it may be generally stated that, while theoretically operable temperatures range from about 100° C. to just below the boiling point of the material being polymerized, the actual operable temperatures, as illustrated in the following examples, range from about 125° C. to about 200° C. or slightly above. Temperatures of 210° C. or higher have been found to result in uncontrollable reactions.

These examples are merely illustrative of the present invention and it is not intended to limit the scope of said invention thereby.

Example I

Ten grams of diallyl maleate were heated in an open container over an oil bath at 140°–150° C. for a period of about 13 hours. No change in viscosity occurred.

However, when an equal amount of diallyl maleate containing 0.01 gram of cupric chloride was similarly heated to the same temperature for the same length of time, a soft, rubbery polymer resulted.

The addition of 0.1 gram of cupric chloride to 10 grams of diallyl maleate, followed by heating to the temperatures specified above, i. e., 140°–150° C., resulted in polymerization to a solid gel after 7 hours of heating.

Example II

Ten grams of diallyl citraconate and 0.1 gram of copper-chromium oxide catalyst were heated in an open container for 1 hour in an oil bath, during which time the temperature rose slowly from 120° C. at the start to 170° C. After 20 minutes at 170° C. the liquid started to thicken, and in another 5 minutes the whole mass was solid. The polymer thus produced was both soft and colorless.

A similar polymer was obtained by carrying out the reaction with a reduced amount of catalyst. Using only 0.01 gram of copper-chromium oxide catalyst with 10 grams of diallyl citraconate, polymerization was found to start after only 10 minutes heating at a temperature of 170° C.

Example III

Diallyl diglycollate was heated in an open container with 0.1 per cent copper sulfate in an oil bath. The temperature was raised slowly from 170° C. to 205° C. over a period of 2½ hours. After heating for 15 minutes at 205° C. the mixture polymerized rapidly to given a brown, hard resin. Cupric chloride and the copper-chromium oxide catalyst produced a similar result in this case.

*Example IV*

Triallyl citrate was heated with 0.1 per cent of the copper-chromium oxide catalyst under the conditions of Example III and was found to produce similar results. In this case polymerization took place after ½ hour at the higher temperature.

*Example V*

Ten grams of diallyl itaconate containing 0.05 gram of copper sulfate was placed in an open container in an oil bath at 175°–180° C. After 40 minutes the liquid became thick and in another 5 minutes it set up completely to a solid mass. Continued heating gave a clear, pale yellow polymer. Using cupric chloride or copper-chromium oxide catalyst in place of the copper sulfate, polymerization took place after about 1 hour to give clear and colorless polymers.

*Example VI*

Two samples of allyl sorbate were treated in the manner of Example V, using copper sulfate and copper-chromium oxide catalysts. After a period of 1½ hours both samples had set to soft, rubbery gels.

*Example VII*

Ten grams of diallyl maleate containing 0.01 gram of cupric chloride were placed in an open container in an oil bath and the temperature gradually raised over a 1 hour period to 200°–210° C. After 10 minutes at this temperature a rapid, uncontrollable reaction occurred with evolution of heat, and a solid polymer was formed. The heat evolved was great enough to cause charring at the center of the polymer due to the poor heat transfer properties thereof.

It will be noted from the foregoing examples that the amount of catalyst required in the method of the present invention is very small, ranging from about 0.01 per cent to about 1 per cent by weight. It will also be noted from the examples that starting temperatures as low as 120° C. are mentioned, e. g. in Example II. However, it is apparent that an actual change in viscosity does not begin until a considerably higher temperature is reached. As indicated in Example I, even at a temperature of 140°–150° C. polymerization takes place very slowly; a period of seven hours being required here. It is safe to say, therefore, that lower polymerization temperatures are impractical. Also, it will be seen that while as a general rule a temperature substantially above 200° C. will cause a charring at the center of the polymer mass due to its poor heat transfer properties, it is possible under some circumstances to use temperatures of as high as 205° C. or very slightly above. Attention is particularly directed to Example III.

The various catalysts vary somewhat in their effectiveness on different compounds. As an example of this variation the following comparative data is supplied:

10 grams of diallyl maleate were placed in each of four open test tubes and to each was added approximately 0.1 gram of one of the four catalysts listed below. The samples were then heated in an oil bath at 140°–150° C. and the following results obtained:

| Catalyst | Time Required for Polymerization |
| --- | --- |
| Cupric chloride | 1 hour. |
| Cupric acetate | 1 hour and 20 minutes. |
| Copper-chromium oxide catalyst | 20 minutes. |
| Cupric sulfate | 15 minutes. |

All polymers produced in this test were hard resins at room temperatures.

The allyl derivatives listed herein are the only ones which have been found to be operable in the method of the present invention. For example, allyl crotonate and allyl benzoate will not polymerize in accordance with the present invention. Likewise, derivatives such as allyl oxy-allyl propionate and diallyl phthalate have been found to be inoperable.

The use of the copper or copper compounds as catalysts for the acceleration of polymerization of the specified compounds enables the omission of the old type peroxide catalysts which presented possible hazards in their usage, for example, benzoyl peroxide can be exploded by shock. Copper and its salts are stable and are not subject to such dangers. Furthermore, the catalysts proposed for use herein are relatively inexpensive and can easily be recovered for re-use over and over in the process.

Obviously many modifications and variations of the invention as hereinbefore set forth may be made without departing from the spirit and scope thereof, and therefore only such limitations should be imposed as are indicated in the appended claims.

I claim:

1. A method for the polymerization of an allyl ester of a carboxylic acid selected from the group consisting of diallyl maleate, diallyl diglycollate, triallyl citrate, diallyl citraconate, dially itaconate, allyl sorbate, and mixtures thereof, which consists of heating said ester in the liquid phase in the presence of a copper-containing compound as a sole polymerization acceleration catalyst at a temperature between 140° C. and 205° C. to form a solid polymer.

2. A method for accelerating the polymerization of an allyl ester of a carboxylic acid selected from the group consisting of diallyl maleate, diallyl diglycollate, triallyl citrate, diallyl citraconate, diallyl itaconate, allyl sorbate, and mixtures thereof, which consists of contacting said ester in the liquid phase with a copper-containing catalyst as sole polymerization acceleration catalyst at a temperature between 140° C. and 205° C. for a time sufficient to form a solid polymer.

3. A method for the polymerization of an allyl ester of a carboxylic acid selected from the group consisting of diallyl maleate, diallyl diglycollate, triallyl citrate, diallyl citraconate, diallyl itaconate, allyl sorbate, and mixtures thereof, which consists of contacting said ester in the liquid phase with a copper-containing compound as sole acceleration catalyst for said polymerization, and heating said mixture at a temperature between 140° C. and 205° C. for a time sufficient to form a solid polymer.

4. A method as in claim 3 wherein the amount of catalyst present ranges from about 0.01 per cent to about 1 per cent by weight.

5. A method for accelerating the polymerization of an allyl ester of a carboxylic acid selected from the group consisting of diallyl maleate, diallyl diglycollate, triallyl citrate, diallyl citraconate, diallyl itaconate, allyl sorbate, and mixtures thereof, which consists of heating said ester in the liquid phase to a temperature within the range 140° C. to 200° C. in the presence of a copper-containing catalyst as sole polymerization acceleration catalyst for a time sufficient to form a solid polymer.

6. A method for the polymerization of an allyl ester of a carboxylic acid selected from the group consisting of diallyl maleate, diallyl diglycollate, triallyl citrate, diallyl citraconate, diallyl itaconate, allyl sorbate, and mixtures thereof, which consists of contacting said ester in the liquid phase with a copper-containing catalyst as sole polymerization acceleration catalyst at a temperature within the range 140° C. to 200° C. for a time sufficient to form a solid polymer.

7. A method for accelerating the polymerization of an allyl ester of a carboxylic acid selected from the group consisting of diallyl maleate, diallyl diglycollate, triallyl citrate, diallyl citraconate, diallyl itaconate, allyl sorbate, and mixtures thereof, which consists of contacting said ester in the liquid phase with a small amount of a copper-containing catalyst as sole polymerization acceleration catalyst and heating the mixture within the range 140° C. to 200° C. for a time sufficient to form a solid polymer.

8. A method for the polymerization of an allyl ester of a carboxylic acid selected from the group consisting of diallyl maleate, diallyl diglycollate, triallyl citrate, diallyl citraconate, diallyl itaconate, allyl sorbate, and mixtures thereof, which consists of contacting said ester in the liquid phase with from about 0.01 per cent to about 1 per cent by weight of a copper-containing catalyst, as sole polymerization acceleration catalyst and heating the mixture within the range 140° C. to 200° C. for a sufficient period of time to form a solid polymer.

9. A method for the polymerization of diallyl maleate which consists of contacting said diallyl maleate in the liquid phase with a small amount of a copper-containing compound as sole polymerization acceleration catalyst and heating the mixture at a temperature between 140° C. and 205° C. for a time sufficient to form a solid polymer.

10. A method for the polymerization of diallyl diglycollate which consists of contacting said diallyl diglycollate in the liquid phase with a small amount of a copper-containing compound as sole polymerization acceleration catalyst and heating the mixture at a temperature between 140° C. and 205° C. for a time sufficient to form a solid polymer.

11. A method for the polymerization of triallyl citrate which consists of contacting said triallyl citrate in the liquid phase with a small amount of a copper-containing compound as sole polymerization acceleration catalyst and heating the mixture at a temperature between 140° C. and 205° C. for a time sufficient to form a solid polymer.

12. A method for the polymerization of diallyl citraconate which consists of contacting said diallyl citraconate in the liquid phase with a small amount of a copper-containing compound as sole polymerization acceleration catalyst and heating the mixture at a temperature between 140° C. and 205° C. for a time sufficient to form a solid polymer.

13. A method for the polymerization of diallyl itaconate which consists of contacting said diallyl itaconate in the liquid phase with a small amount of a copper-containing compound as sole polymerization acceleration catalyst and heating the mixture at a temperature between 140° C. and 205° C. for a time sufficient to form a solid polymer.

References Cited in the file of this patent

UNITED STATES PATENTS

| Number | Name | Date |
| --- | --- | --- |
| 2,249,768 | Kropa | July 22, 1941 |
| 2,254,382 | Neher | Sept. 2, 1941 |
| 2,339,058 | D'Alelio | Jan. 11, 1944 |
| 2,475,296 | Shokal et al. | July 5, 1949 |